United States Patent Office  
3,697,442  
Patented Oct. 10, 1972

3,697,442
COMPOSITIONS FOR CONTROLLING FOAM IN AQUEOUS SYSTEMS AND ITS METHOD OF USE
Hillel Lieberman, Andalusia, Pa., assignor to Betz Laboratories, Inc., Trevose, Pa.
No Drawing. Filed Aug. 13, 1970, Ser. No. 63,636
Int. Cl. B01d *17/00*
U.S. Cl. 252—321
22 Claims

ABSTRACT OF THE DISCLOSURE

This disclosure relates to defoaming compositions and their use in controlling foam in aqueous systems. The compositions which can be emulsive in character contain a combination of a mixture of aluminum oxide particles and hydrophobic silica particles, at least one alkaline earth metal hydroxide, at least one fatty acid containing 6 to 24 and preferably 16 to 22 carbon atoms, and a water-insoluble liquid organic carrier. The composition may contain water, and where the liquid carrier is hydrophobic in character, the composition will be an emulsion. In certain instances it is desirable to incorporate surface-active agents (surfactants) or spreading agents in the composition.

BACKGROUND OF THE INVENTION

Foam is a most undesirable by-product in most industries since it does have a direct and drastic effect upon production efficiency and consequently on the economics of a system or process. In some systems, foam can be tolerated to a certain extent. However in most systems such as in the pulp and paper producing processes, the latex emulsion preparation and processing systems, etc., the quality and acceptability of the product is dependent upon the control of foam.

To date, many different defoamers have been recommended for use in kraft pulp mill applications. Of those which bear mentioning are the hydrophobic particle and in particular the hydrophobic silica containing defoamers (note e.g. U.S. Pats. Nos. 3,076,768 and 3,207,698) and the colloidal aluminum oxide defoamers (note copending application Ser. No. 827,943 filed May 26, 1969). However because of the particularities which are found among the different pulping or paper making processes, the industry is constantly attempting to develop defoamers that will be effective, if not in all applications, in at least a great percentage of the cases, or defoamers which provide an improvement over existing defoamers.

The differences in temperature, wood used, resin content, agitation rates, production speed, solids' content, charge formulas etc. all make the objective of supplying one economic defoamer composition for all applications rather illusive.

Moreover the same problems exist in latex formulation and processing. Although obviously there generally is no fiber content in these systems, the diversity arises from the many different type polymeric materials which are used as the primary substituent of these systems.

Accordingly, it was the present inventor's objective to formulate defoamers which might meet the above-described goals. A more comprehensive description of the systems relative to brown stock defoamers and the problems they must overcome and where they are found are discussed in copending U.S. application Ser. No. 809,931, filed Mar. 24, 1969.

GENERAL DESCRIPTION OF THE INVENTION

As stated in the abstract above, the present invention is directed to defoamer compositions and their use in curbing or controlling foam in aqueous systems. The present inventor discovered that if a small but effective amount of a composition containing:

(i) A mixture comprising hydrophobic silica particles and colloidal aluminum oxide particles,
(ii) At least one alkali or alkaline earth metal oxide or hydroxide,
(iii) At least one fatty acid, and
(iv) Water-insoluble organic liquid, with or without water was added to an aqueous system which ordinarily would yield a large quantity of foam, that the system could be controlled to such an extent that the foam problems normally encountered were reduced or no longer extant.

The character of the composition is different depending of course, upon whether water is incorporated or not, and upon the type water-insoluble organic liquid employed. In any case, the composition obtained is pourable at room and application temperature. The composition is effective whether water is present in the composition or not. However, although the presence of water in the composition does not contribute to the pourability of the product, it does aid in the production of a more stable product since an emulsion is formed. In some instances, it is desirable to incorporate, depending upon the variations encountered, a surfactant or spreading agent.

The effective treatment levels for the inventiive composition were determined to be within the range of from about 0.01% to about 1% by weight of the defoamer based upon the weight of the dry solids content of the aqueous system. Although as explained above, many factors can cause or contribute to the production and existence of foam in an aqueous system, the prime factor is considered to be the "solids content" of the aqueous system. Accordingly, in many instances this factor has been used in the industry to approximate treatment level. The general practice with the present composition is to add to the system on a weight basis from about 1 to about 100 parts of the composition per million parts of water in the system since most foam problems are controlled using treatment levels within this range. Although treatment levels abolt 1% (based on a solids content) or 100 p.p.m. (based on weight of system) are successful in controlling foam, the use of excesses above these levels are prohibitive due to cost considerations.

The composition of the invention contains as its major substituents, on a weight basis from about 0.1% to about 10%, and preferably from about 2% to about 6% of alkaline earth or alkali metal oxide or hydroxide, from about 0.1% to about 10%, and preferably from about 2% to 6% fatty acid, from about 60% to about 98% and preferably, from about 84% to about 94% water insoluble organic liquid, and from about 0.5% to about 20% and preferably from about 2% to about 15% of a mixture comprising colloidal aluminum oxide particles and hydrophobic silica particles. The respective particles may comprise the mixture in any weight range, such as, 95% by weight hydrophobic silica particles to 5% by weight colloidal aluminum oxide particles or 5% hydrophobic silica particles and 95% colloidal aluminum oxide particles. Although the previously described ranges and lower ranges i.e. more than 95% and less than 5% have been found to yield satisfactory results, the preferred range is 75%:25% to 25%:75% of the hydrophobic silica particles to the colloidal aluminum oxide particles.

When water is included in the composition it is included in an amount of from about 0.1% to about 10%, and preferably from about 2% to about 6%. The spreading agent or surfactant, if included can be present in amounts from about 0.1% to about 10%, and preferably from about 0.1% to about 5.0%. The content of the spreading agent or surfactant will vary depending upon the specific requirement of the particular application.

The aluminum oxide particles which are used in accordance with the present invention are any of the colloidal aluminum oxides which are of fine particle size. By fine particles size is meant that the average particle diameter is less than 15 microns and preferably in the range of from about 0.01 to about 1.3 microns. Aluminum oxide particles of this nature are prepared by various methods. One of the most widely used is the hydrolysis of aluminum chloride in a flame. Oxides obtained by this method possess extremely small particle diameter, high surface area and high purity. However, it should be noted that aluminum oxide particles obtained by other methods which yield substantially the same properties are also useful in accordance with the present invention. Aqueous suspensions (10%) of the aluminum oxides which are used yield pH's which range anywhere from 2.1 to 5.4.

The hydrophobic silica particle or its equivalent which may be used in accordance with the present invention are those described in U.S. Pats. 3,076,768 and 3,408,306. Generally the particles or the silica particles must be treated to render the surfaces thereof hydrophobic. In the case of silica, silica aerogel, fumed silica and precipitated silica are treated according to known methods to render the surfaces of the colloidal or particulate silica hydrophobic. The hydrophobic solid particles will desirably have an average particle size of 10 microns or less and preferably, the particles will possess an average particle size ranging from about 0.005 to about 5 microns.

The metal oxides or hydroxides of the invention can be of any metal. However the most effective compositions are those which contain an alkali metal such as sodium, potassium or ammonium and/or an alkaline earth metal such as magnesium, calcium or barium, or a mixture of oxides or hydroxides.

The fatty acids which have given the most effective formulations are those which contain from about 16 to 22 carbon atoms, such as palmitic, margaric, stearic, abietic, arachidic, eicosanoic, oleic, linolenic, linoleic etc. acids. However, the $C_6$–$C_{15}$ and the $C_{23}$ and $C_{24}$ acids such as capric, heptoic, caprylic, nonylic, caproic, undecylic, lauric, tridecylic, myristic and pentadecylic have also been found to yield effective compositions. Moreover compositions containing mixtures of these acids were also found to be satifactory.

The water-insoluble organic liquids which are suitable for inclusion in the composition are the vegetable oils, such as the water-insoluble edible oils which are extracted from seeds and which are generally considered to be mixtures of glycerides, the aliphatic hydrocarbons, the alicylic hydrocarbons and the aromatic hydrocarbons and the halogenated derivatives thereof. These generic descriptions include many type carriers or liquids such as benzene, hexane, octane, mineral hydrocarbons such as the mineral oils (paraffinic oils, naphthenic oils, halogenated products thereof and kerosene), mineral seal oil and similar petroleum fractions, synthetic polymers and halogenated products thereof, such as the liquid trifluorovinyl chloride polymers, long chain alcohols such as nonyl alcohol and octyl alcohol, long chain esters such as diglycol laurate, and long chain amines such as octyl amine, nonyl amine and 2-ethyl-1-amino-heptane. In many instances these liquid carriers are not only water-insoluble but also hydrophobic.

Preferably the carrier liquid should be of such nature that its boiling point be greater than 150° F. and its viscosity be such as to be liquid at room temperature. In the case of mineral hydrocarbons a viscosity of about 30 to 400 SUS (100° F.) has been found to be completely acceptable. From the vast number of water-insoluble liquids evaluated, it would appear that any liquid which possesses the aforementioned properties would be operable.

Spreading agents or surfactants which are commercially available such as decyl alcohol, silicone oils (Union Carbides L–45) and the polyether triols of high molecular weight (Union Carbides LHT–42) have been used successfully in the inventive compositions. These agents are generally included where rapid distribution of the defoamer in a particular system is required.

The compositions of the invention can be made simply and by preparing a mixture of the hydrophobic silica particles and aluminum oxide particles and combining the mixture with the metal oxide or hydroxide, fatty acid and water-insoluble organic liquid (with or without water). The combination can then be heated at a temperature and for a time sufficient to obtain a smooth flowing evenly-mixed product.

The use of temperatures ranging from about 160 to about 220° F. and preferably from 180–220° F. and times of from about 15 to about 90 minutes, and preferably from 35 to 55 minutes have resulted in products possessing the prerequisite features.

In order to determine the defoaming capacities of the compositions of the invention, a test procedure was devised which would not only establish the defoaming-antifoaming characteristics of the composition but also the "substantivity" of the compositions.

The testing procedure generally entails the following steps:

400 milliliters (ml.) of concentrated black liquor having a temperature of 180° F. (which temperature is generally used in mill operations), a dissolved solids content of approximately 7½% (28 grams) and a pH of about 12 are mixed with approximately 12 grams of a fiber or a mixture of fibers to produce a slurry of approximately ½% consistency. The mixture is then heated to maintain the 180° F. temperature.

To the slurry is then added a portion of the defoamer to be tested. The resulting slurry is mixed well, filtered and washed with water and black liquor. The filtrate in each case is discarded. Approximately fifteen (15) grams of the damp fiber obtained is slurried in 600 ml. of a dilute solution of the black liquor (9 parts water for each 1 part of concentrated black liquor). The resulting slurry is then circulated from the calibrated reservoir holding the slurry to and through a pump and back to the reservoir. This action agitates the slurry and simulates the conditions which are normally encountered in the washing and screening stages of the pulp during its production and purification. The reservoir is calibrated in centimeters in order to measure the foam height at various time intervals which is a mode of measuring the degree of foaming of a system or in other terms, the defoaming or antifoaming action of the composition. The height of the foam is noted at various intervals and the longer the time required for the foam to reach a certain level the better the inhibiting properties of the composition The calibrations of the reservoir range from 0 to 300 centimeters with the normal slurry volume taking up the first 100 cm. A reading therefore "100" means that essentially no foam formed during the respective period. The last reading is made when the foam overflows the reservoir or exceeds the 300 centimeter level.

The test is an excellent measure of the defoaming characteristics of a composition since it is quite stringest. It will be noted that the initial slurry to which the defoamer was added is filtered and the filtrate is discarded and that the fibers were then washed. Accordingly, the defoaming action of the composition is entirely due to the residual amount of composition which remains with the fiber. The test consequently, not only measures the defoaming or antifoaming capacity of a composition under the most adverse conditions but also the composition's "substantivity" i.e. its capacity to remain with the fiber and to perform its function when present in only minor quantities.

Having thus described the invention generally, specific embodiments thereof are set forth below. However, these embodiments are included as representative only and are not intended to be limitative of specific embodiments.

EXAMPLE 1

A mixture containing the following ingredients, in the respective percent by weight based upon the total weight of the composition was prepared and mixed thoroughly.

6.3% by weight of Alon C (Cabot Corp.—Alon C is a colloidal aluminum oxide, $Al_2O_3$, prepared by the hydrolysis of aluminum chloride in a flame. The particles of aluminum oxide possess a surface area of approximately 100 square meters/gram and possess a pH of about 4.4 when made into a 10% aqueous suspension.
89.4% paraffinic hydrocarbon oil (Atlantic Corp.—Alpha Oil C which possesses a specific gravity of 0.86 at 60° F. and an SUS Viscosity of 150 at 100° F.
3.6% Fatty acids (Neofat 1859—a mixture of palmitic and stearic acids)
0.45% calcium hydroxide
0.25% surfactant (Union Carbide L-45)

The mixture was heated at a temperature of 180° F. for a period of 45 minutes. The product obtained was a milk colored, evenly mixed liquid which flowed smoothly at room temperature.

EXAMPLE 2

A product was prepared in the manner described in Example 1 with the exception that the mixture contained:

8% hydrophobic silica particles
92% Alpha-Oil C (paraffinic mineral oil)

The product obtained was a smooth flowing liquid which was completely fluid at room temperature.

EXAMPLE 3

The product of this sample was obtained by mixing 75 parts by weight of the product obtained from Example 1 with 25 parts by weight of the product obtained in Example 2. The resulting composition according was:

4.73% aluminum oxide particles (Alon C)
2.00% hydropholic silica particles
90.05% paraffinic mineral oil (Alpha-Oil C)
2.70% fatty acids (Neofat 1859)
0.34% calcium hydroxide
0.18% surfactant (Union Carbide L-45)

The product was a smooth-flowing liquid.

EXAMPLE 4

The product of this example was obtained by mixing 25 parts by weight of the product obtained in Example 1 with 75 parts by weight of the product obtained in accordance with Example 2. The composition accordingly was:

1.575% aluminum oxide particles (Alon C)
6.0% hydrophobic silica particles
91.35% paraffinic hydrocarbon oil (Atlantic's Alpha Oil-C)
0.9% Neofat 1859
0.1125% calcium hydroxide
0.0625% surfactant (Union Carbide L-45)

The product obtained was evenuly mixed and fluid at room temperature.

EXAMPLE 5

The product of the example was prepared by mixing 50 parts by weight of the product obtained in Example 1 with 50 parts by weight of the product obtained in accordance with Example 2. This composition accordingly was composed of:

3.15% aluminum oxide particles (Alon-C)
4.00% hydrophobic silica particles
1.80% fatty acid (Neofat 1859)
0.23% calcium hydroxide
0.12% surfactant
90.70% paraffinic hydrocarbon oil The product obtained was a smooth flowing liquid.

Defoaming capacity of the composition of Examples 1 through 5

The compositions of Examples 1–5 were tested according to the procedure outlined above. In the tests the fibers were those obtained from the suorce indicated under the appropriate heading of the tables illustrating the results obtained. In some of the tests, the present compositions were also compared with various commercially available products. These products are composed essentially of hydrophobic silica dispersed in various water-insoluble hydrocarbons, such as mineral oils. The products differ in silica content and in some cases the products contained surface active agents.

Since the activity of these commercial products relates to the hydrophobic silica content, the products are described in this manner.

Product A contains 10% by weight hydrophobic silica.
Product B contains 20% by weight hydrophobic silica.
Product C contains 12% by weight hydrophobic silica.
Product D contains 15% by weight hydrophobic silica.

The concentration of the defoamer was approximately 0.01 gram which represented about 0.02% by weight of the dissolved solids of the black liquor.

TABLE 1

| Composition of— | Source of fiber | Percent by weight Aluminum oxide | Percent by weight Hydrophobic silica | Percent by weight based upon total weight in formulation Aluminum | Percent by weight based upon total weight in formulation Silica | Foam height (cm.) at designated intervals— 10 sec. | 20 sec. | 30 sec. | 60 sec. | 90 sec. | 120 sec. | Time (sec.) of overflow [1] |
|---|---|---|---|---|---|---|---|---|---|---|---|---|
| Example 1 | Pulp mill located in Maryland—southern pine fiber used to produce pulp. | 6.3 | | 100 | | 220 | 275 | | | | | 28 |
| Example 2 | do | | 8.0 | | 100 | 240 | 280 | | | | | 25 |
| Example 3 | do | 4.73 | 2.0 | 70.2 | 29.8 | 210 | 250 | 280 | | | | 53 |
| Example 4 | do | 1.575 | 6.0 | 20.8 | 79.2 | 200 | 220 | 260 | | | | 56 |
| Example 5 | do | 3.15 | 4.0 | 45.0 | 55.0 | 180 | 200 | 210 | 225 | 225 | | 116 |
| Example 1 | Pulp mill located in California—spruce fiber | 6.3 | | 100.0 | 275 | | | | | | | 18 |
| Example 2 | do | | 8.0 | | .0 | 250 | 275 | | | | | 29 |
| Example 3 | do | 4.73 | 2.0 | 70.2 | 29.8 | 175 | 210 | 245 | 280 | | | 64 |
| Example 4 | do | 1.575 | 6.0 | 20.8 | 79.2 | 185 | 220 | 255 | | | | 58 |
| Example 5 | do | 3.15 | 4.0 | 45.0 | 55.0 | 160 | 190 | 215 | 245 | | | 87 |

[1] I.e. time required for foam to reach 300 cm.

The results obtained and as recorded in Table 1 illustrate a true synergistic relationship when the aluminum oxide is used in conjunction with the hydrophobic silica particles. In each instance the defoamer containing the combination yielded results which were superior to the results obtained with defoamers containing either of the ingredients above. For example with the pulp from the Maryland based pulp mill, the product containing 4.73% aluminum oxide and 2.0% hydrophobic silica particles was approximately two times as effective as the defoamers containing respectively, 6.3% and 8% of the particular particles. The same was true for the defoamer containing the 1.58%–6.0% combination, while the composition containing 3.15% and 4.0% was over 4 times as effective. Accordingly the synergism is illustrated by the recorded data.

As earlier stated, however, peculiarities within a given pulp system such as temperature, degree of agitation, type wood fiber etc. will not always permit the obtention of linear type data for all different concentrations for the respective particles. In some applications, the defoaming composition comprising 4.73% aluminum oxide and 2.0% hydrophobic silica may show only slight synergism while in the same application the composition containing 1.5% and 6.0% the respective particles may exhibit a substantial synergistic behavior.

When a particular combination is found to behave synergistically as is evidenced by the data of Table 1, then in a particular mill application or in a test procedure using the fiber of the mill, various formulations of the composition can be tested to ascertain what particular composition is effective for that particular application or fiber.

The data as contained in Table 2 substantiates this premise since in all situations at least one formulation was found to exhibit a pronounced effect which could not have been predicated from using defoamers containing the individual particles alone. The test procedure was that as described above.

tive than defoamers containing the respective particles alone. For example, with the pulp derived from the mill located in Georgia, the composition of Example 3 was substantially more effective than any of the other compositions. With the pulp obtained from the mill located in Mississippi, the composition of Example 4 was significantly more effective than the remaining compositions, while with the pulp obtained from the mills located in New Hampshire and Pennsylvania, the composition of Example 5 was substantially more effective than any of the others.

The test conducted and data collected in Table 2 clearly substantiates the synergistic type situations which were ascertained during the initial testing, the results of which are recorded in Table 1.

EXAMPLE 6

In order to establish the in-mill" effectiveness of the compositions, the in-lab data collected for the Maryland based mil was considered, and the data indicated that the composition of Example 5 was the most effective. In-mill" trial quantities of this product were produced and an "in-mill' trial was performed. The mill process was run at approximately 185° F. with a production rate of 150 tons per day. The fiber utilized was derived from Southern Pine. The application was specifically in the brown stock washer in the pulping operation.

The trial revealed that the composition was quite effective for the purpose and that a feed rate of 10 parts per million offered a 20% improvement on a cost performance basis over the defoamer the plant was using. The defoamer used by the mill contained only hydrophobic

TABLE 2

| Composition of— | Source of fiber stock | Percent by weight | | Foam height (cm.) after designated intervals— | | | | | | Time (sec.) of overflow [1] |
|---|---|---|---|---|---|---|---|---|---|---|
| | | Aluminum oxide | Hydrophobic silica | 10 sec. | 20 sec. | 30 sec. | 60 sec. | 90 sec. | 120 sec. | |
| Example 1 | Paper and pulp mill located in Georgia (Sample 1) | 6.3 | | 215 | 240 | 265 | | | | 50 |
| Example 2 | do | | 8.0 | 260 | | | | | | 18 |
| Example 3 | do | 4.73 | 2.0 | 210 | 230 | 250 | 270 | 280 | 290 | 125 |
| Example 4 | do | 1.575 | 6.0 | 230 | 260 | 290 | | | | 55 |
| Example 5 | do | 3.15 | 4.0 | 225 | 260 | 270 | 290 | | | 62 |
| Product A | do | | 10.0 | 220 | 270 | 290 | | | | 38 |
| Example 1 | Same mill as above (Sample 2) | 6.3 | | 215 | 240 | 265 | | | | 53 |
| Example 2 | do | | 8 | 265 | | | | | | 19 |
| Example 3 | do | 4.73 | 2.0 | 210 | 230 | 250 | 270 | 280 | | 130 |
| Example 4 | do | 1.575 | 6.0 | 230 | 255 | 290 | | | | 62 |
| Example 5 | do | 3.15 | 4.0 | 225 | 260 | 270 | 290 | | | 65 |
| Product A | do | | 10.0 | 220 | 270 | 285 | | | | 39 |
| Example 1 | Paper and pulp mill located in Mississippi (Sample 1) | 6.3 | | 230 | 240 | 260 | 270 | | | 89 |
| Example 2 | do | | | 250 | 275 | 285 | 295 | | | 75 |
| Example 3 | do | 4.73 | 2.0 | 250 | 270 | 280 | 285 | | | 80 |
| Example 4 | do | 1.575 | 6.0 | 220 | 230 | 240 | 250 | 260 | 280 | 148 |
| Example 5 | do | 3.15 | 4.0 | 240 | 260 | 275 | 280 | 280 | | 110 |
| Product A | do | | 10.0 | 260 | 270 | 280 | 280 | 209 | | 95 |
| Product B | do | | 20.0 | 280 | 285 | 290 | | | | 53 |
| Example 1 | Same mill as above (Sample 2) | 6.3 | | 235 | 240 | 255 | 265 | 300 | | 90 |
| Example 2 | do | | 8.0 | 250 | 275 | 285 | 295 | 295 | | 77 |
| Example 3 | do | 4.73 | 2.0 | 250 | 270 | 285 | 290 | | | 78 |
| Example 4 | do | 1.575 | 6.0 | 220 | 230 | 240 | 250 | 265 | 280 | 149 |
| Example 5 | do | 3.15 | 4.0 | 240 | 260 | 275 | 280 | 285 | | 111 |
| Product A | do | | 10.0 | 255 | 270 | 280 | 280 | | | 99 |
| Product B | do | | 20.0 | 280 | 285 | 290 | | | | 52 |
| Example 1 | Paper and pulp mill located in New Hampshire (Sample 1) | 6.3 | | 260 | 270 | 280 | 290 | | | 75 |
| Example 2 | do | | 8.0 | 270 | 280 | 290 | | | | 38 |
| Example 3 | do | 4.73 | 2.0 | 245 | 255 | 265 | 275 | | | 90 |
| Example 4 | do | 1.575 | 6.0 | 255 | 270 | 280 | 280 | | | 79 |
| Example 5 | do | 3.15 | 4.0 | 210 | 220 | 225 | 230 | 250 | 260 | 212 |
| Product C | do | | 12.0 | 240 | 250 | 260 | 275 | 290 | | 98 |
| Example 1 | Same mill as above (Sample 2) | 6.3 | | 260 | 270 | 280 | 290 | | | 77 |
| Example 2 | do | | 8.0 | 270 | 280 | 290 | | | | 40 |
| Example 3 | do | 4.73 | 2.0 | 250 | 255 | 260 | 275 | | | 90 |
| Example 4 | do | 1.575 | 6.0 | 255 | 265 | 280 | 280 | | | 79 |
| Example 5 | do | 3.15 | 4.0 | 210 | 220 | 225 | 230 | 250 | 255 | 207 |
| Product C | do | | 12.0 | 250 | 250 | 260 | 270 | 290 | | 98 |
| Product A | Paper and pulp mill located in Penna. (1) | | 10.0 | 240 | 270 | 275 | | | | 42 |
| Product D | do | | 15.0 | 300 | | | | | | 10 |
| Example 1 | do | 6.3 | | 220 | 240 | 260 | 280 | | | 89 |
| Example 2 | do | | 8.0 | 240 | 265 | 270 | | | | 50 |
| Example 3 | do | 4.73 | 2.0 | 195 | 255 | 280 | 290 | | | 72 |
| Example 4 | do | 1.575 | 6.0 | 210 | 260 | 290 | | | | 59 |
| Example 5 | do | 3.15 | 4.0 | 170 | 200 | 220 | 240 | 250 | 260 | 165 |

[1] I.e. time required for foam to exceed 300 cm.

As earlier stated, the data contained in Table 2 establishes that at least one particular formulation of the instant defoaming composition was substantially more effecsilica and was more costly since the silica content was 5% higher than the combined particle content of the composition of Example 5.

Conclusions

In all of the above trails, the compositions of the present invention proved to be superior to the commercially available hydrophobic silica defoamers. In those cases where the test data were quite close or the commercially available products gave slightly better results, the present compositions offered more advantages since they contained less active constituent in comparison with the hydrophobic silica products. This fact in itself establishes the economic advantages of lower raw material costs and faster and more economic production. As can be appreciated, when working with particles having the sizes described, it is difficult to handle and to add these materials efficiently to the remaining ingredients to produce the compositions. Therefore the need for lower quantities of active ingredient not only greatly aids in the preparation of the compositions, but also leads to products of lower unit cost, which products are as effective and in many cases more effective than the commercially available products.

The foregoing examples demonstrate the type compositions which were tested comprehensively. To test the overall concept, various compositions were made which contained the higher and lower concentration ranges disclosed for the respective ingredients of the composition and to establish the results obtainable by the substitution of (i) Magnesium, barium, sodium, potassium and/or ammonium hydroxide for the calcium hydroxide, (ii) The various water-insoluble organic liquids disclosed for the oil used in the specific examples, and (iii) The various fatty acids and mixtures thereof for the fatty acids of the specific examples.

Moreover, the temperature and time of heating ranges as disclosed for the preparation of the compositions were tested to clearly establish the best ranges. In all instances the compositions produced exhibited defoaming capacities congruous with those obtained with the compositions of Examples 3 through 5. Some compositions although operating quite superiorly on various stock samples, operated just satisfactorily on others. However, the concept was borne out by the testing and the worker in the art upon being appraised of the concept, will have no difficulty in ascertaining which composition would suit his purpose, performancewise and costwise.

EXAMPLES 7 THROUGH 9

The compositions of Examples 3 through 5 were reproduced with the exception that water was used in the formulation of the compositions. The percentages by weight of the water i.e. 4% in the respective products of the examples were reflected by decreasing the weight-percent of the respective water-insoluble organic liquid. The compositions obtained were tested according to the procedure outlined above against the compositions as obtained in Examples 3 through 5. The fiber or wood stock used of course was of the same type. The comparative results established that although the effectiveness of the compositions containing the water was not as great as that obtained using the water-free compositions, the effectiveness was not significantly different. A visual comparison of the compositions however showed that the non-water containing compositions were not as smooth-flowing due to some undissolved or undispersed ingredient.

EXAMPLES 9 THROUGH 12

Examples 3 through 5 were repeated with the exception that the surfactant was excluded from the formulations. The differences in the percentage by weight resulting from the exclusion of the surfactant were reflected by a comparable increase in the weight-percent of the respective water-insoluble organic liquid.

The compositions of Examples 9 through 12 were comparatively tested with the compositions of Examples 3 through 5 according to the procedure outlined. The compositions of Examples 9 through 12 proved to be slightly less effective than those of Examples 3 through 5. This conclusion was felt to be directly contributable to the spreading or dispersing effect of the surfactant.

EXAMPLES 13 THROUGH 15

As established by the foregoing the inclusion of a surfactant did offer some advantage. However, the examples established this fact solely for compositions which contained no water. In order to demonstrate the effectiveness of compositions containing surfactants in the presence of water, Examples 7 through 9 were repeated with the exception that a higher concentration of surfactants were added. The composition of Example 13 contained 10% decyl alcohol, the composition of Example 14 contained 1% silicone oil (Union Carbide L-45) and the composition of Example 15 contained 5% polyether triol of high molecular weight (Union Carbide LHT-42). The differences in the percentage by weight resulting from the addition of the surfactants was reflected by a comparable lowering in the percent by weight of the respective water-insoluble organic liquid.

The compositions of Examples 13 through 15 were comparatively tested against those compositions as derived in Examples 3 through 5 and Examples 7 through 9. The testing established the products of Examples 13 through 15 to be more effective. This improvement is believed to be due to the dispersive characteristics of the spreading agents added.

As earlier stated the present composition and processes are applicable to other industries or systems where aqueous systems are utilized during the preparation or processing of various products.

Such systems which have caused concern for the formulators are the aqueous latex emulsions systems such as those commonly employed in the paint industry. During the preparation of an emulsion of this nature, there are several points in the process where foaming is a constant and vexing problem.

For example the cooling stage following cooking of latex formulations has been until recently, plagued with foaming problems. The foregoing is particularly prominent in acrylic formulations, since added emulsification is necessary because the particle size of the latex is smaller and the viscosity of the formulation is lower. All of which contributes to the foaming potential. This particular type latex is considered to be the worst from the foam standpoint by plant personnel.

Accordingly in order to establish the effectiveness or the ineffectiveness of the present compositions in curbing or controlling foam in the latex formations, a sample of the acrylic latex formulation considered to possess the worst foaming potential by plant personnel was subjected to a test procedure. This procedure was similar to that as described earlier and as used to test the effectiveness of the compositions as foam controlling agents for brown-stock washers. The procedure was modified in that no washing was necessary. The samples of latex which were heated to a temperature of 70° C. were added to the reservoir described in the test procedure and circulated as described. The foam heights at the respective intervals were noted to determine the effectiveness of the particular compositions. To 400 grams of the latex was added approximately 1 cc. or 2.5 p.p.m. of the defoaming compositions containing the blends of colloidal aluminum which contained no defoamer.

The results obtained were as follows:

TABLE 3

| Composition of— | Percent by weight | | Foam height (cm.) after designated intervals | | | | | | Time (sec.) of overflow, i.e. time required for foam to exceed 300 cm. |
| --- | --- | --- | --- | --- | --- | --- | --- | --- | --- |
| | Aluminum oxide | Hydrophobic silica | 10 sec. | 20 sec. | 30 sec. | 60 sec. | 90 sec. | 120 sec. | |
| Control (no defoamer) | | | 280 | | | | | | 7. |
| Example 1 | 6.3 | | 280 | | | | | | 18. |
| Example 2 | | 8.0 | 295 | | | | | | 12. |
| Example 3A | 4.4 | 2.4 | 195 | 220 | 235 | 230 | 220 | 215 | Did not overflow. |
| Example 5 | 3.15 | 4.0 | 180 | 190 | 200 | 210 | 210 | 210 | Do. |
| Product C | | 12.0 | 290 | | | | | | 12. |

The foregoing data conclusively illustrates that compositions containin gthe blends of colloidal aluminum oxide particles with hydrophobic silica particles were quite effective for the purpose, while the commercial product and the compositions containing solely the respective particles were significantly less effective.

Table 3 lists the composition of Example 3A. This composition is essentially the same as the composition of Example 3 excepting that it contained the following percentages by weight of ingredients.

4.4% aluminum oxide particles (Alon C)
2.4% hydrophobic silica particles
2.52% fatty acid (Neofat 1859)
0.315% calcium hydroxide
0.175% Union Carbide L-45 (Surfactant)
90.18% mineral oil (Alpha Oil-C)

Accordingly, having thus described the invention, what is claimed is:

1. A product for controlling foam; said product being obtained by heating to a temperature of from about 160 to about 220° F. and for about 15 to about 90 minutes, a composition comprising on a weight basis:
   (i) from about 0.1 to about 10% of at least one metal compound selected from the group consisting of alkaline earth metal oxide or hydroxide and alkali metal oxide or hydroxide;
   (ii) from about 0.1 to about 10% of at least one fatty acid having from about 6 to about 24 carbon atoms;
   (iii) from about 60 to about 98% of a water-insoluble organic liquid selected from the group consisting essentially of vegetable oils, aliphatic hydrocarbons, alicyclic hydrocarbons, halogenated aromatic hydrocarbons, long chain alcohols, long chain esters and long chain amines; and
   (iv) from about 0.5 to about 20% of a mixture comprising
      (a) from about 5 to 95% by weight of finely divided aluminum oxide particles having an average particle diameter of less than 15 microns and prepared by the hydrolysis of aluminum chloride in a flame, and
      (b) from about 95 to 5% by weight of finely divided hydrophobic silica particles.

2. A product according to claim 1 wherein the composition contains from about 0.1 to about 5% of a surfactant selected from the group consisting of decyl alcohols, silicone oils and polyether polyols.

3. A porduct according to claim 2 wherein the composition consists from about 0.1 to about 10% water.

4. A product according to claim 1 wherein the composition contains from about 0.1 to about 10% water.

5. A product according to claim 1 wherein said composition is heated to a temperature of from about 180° to about 220° F. for a time of from about 35 to about 55 minutes and said composition comprises from about 2% to aobut 6% of said metal compound; from about 2% to about 6% of said fatty acid; from about 84% to about 94% of said water-insoluble organic liquid and from about 2 to about 15% of said mixture of aluminum oxide and silica particles.

6. A product according to claim 5 wherein the composition contains from about 2% to about 6% water.

7. A product according to claim 5 wherein the composition contains from about 0.1 to about 5% of a surfactant selected from the group consisting of decyl alcohols, silicone oils and polyether polyols.

8. A product according to claim 7 wherein the composition contains from about 2% to about 6% water.

9. A product according to claim 7 wherein said metal compound is calcium hydroxide, said fatty acid is a mixture of palmitic and stearic acids, and said water-insoluble organic liquid is a refined mineral oil.

10. A product according to claim 9 wherein said mixture of aluminum oxide and silica particles comprises on a weight basis from about 25% to 75% aluminum oxide particles and from about 75% to about 25% of said hydrophobic silica particles.

11. A product according to claim 10 wherein said composition contains from about 0.1 to about 5% of a silicone oil surfactant.

12. A method for controlling foam in an aqueous system which comprises adding thereto an effective amount for the purpose of a product obtained by heating to a temperature of from about 160° to about 220° F. and for about 15 to about 90 minutes, a composition comprising on a weight basis:
   (i) from about 0.1 to about 10% of at least one metal compound selected from the group consisting of alkaline earth metal oxide or hydroxide and alkali metal oxide or hydroxide;
   (ii) from about 0.1 to about 10% of at least one fatty acid having from about 6 to about 24 carbon atoms;
   (iii) from about 60 to about 98% of a water-insoluble organic liquid selected from the group consisting essentially of vegetable oils, aliphatic hydrocarbons, alicyclic hydrocarbons, halogenated aromatic hydrocarbons, long chain alcohols, long chain esters and long chain amines; and
   (iv) from about 0.5 to about 20% of a mixture comprising
      (a) from about 5 to 95% by weight of finely divided aluminum oxide particles having an average particle diameter of less than 15 microns and prepared by the hydrolysis of aluminum chloride in a flame, and
      (b) from about 95 to 5% by weight of finely divided hydrophobic silica particles.

13. A method according to claim 12 wherein the composition contains from about 0.1 to about 5% of a surfactant selected from the group consisting of decyl alcohols, silicone oils and polyether polyols.

14. A method according to claim 12 wherein the composition contains from about 0.1 to about 10% water.

15. A method according to claim 14 wherein the composition contains from about 0.1 to about 10% water.

16. A method according to claim 12 wherein said composition is heated to a temperature of from about 180° to about 220° F. for a time of from about 35 to about 55 minutes and said composition comprises from about 2% to about 6% of said metal compound; from about 2% to about 6% of said fatty acid; from about 84 to about 94% of said water-insoluble organic liquid and from about 2 to about 15% of said mixture of aluminum oxide and silica particles.

17. A method according to claim 16 wherein the composition contains from about 2% to about 6% water.

18. A method according to claim 16 wherein the composition contains from about 0.1 to about 5% of a surfactant selected from the group consisting of decyl alcohols, silicone oils and polyether polyols.

19. A method according to claim 16 wherein said metal compound is calcium hydroxide, said fatty acid is a mixture of palmitic and stearic acids and said water-insoluble organic liquid is a refined mineral oil.

20. A method according to claim 19 wherein said mixture of aluminum oxide and silica particles comprises on a weight basis from about 25% to 75% aluminum oxide particles and from about 75% to about 25% of said hydrophobic silica particles.

21. A method according to claim 20 wherein said composition contains from about 0.1 to about 5% of a silicone oil surfactant.

22. A method according to claim 16 wherein the aqueous system is a Kraft pulp mill system and said product is added in an amount of from about 1 to 100 parts per million parts of said aqueous system.

References Cited

UNITED STATES PATENTS

| | | | |
|---|---|---|---|
| 2,052,164 | 8/1936 | Buc | 252—321 |
| 2,169,369 | 8/1939 | Osterloh et al. | 252—321 |
| 2,282,112 | 5/1942 | Bergström | 252—321 |
| 2,954,347 | 9/1960 | St. John et al. | 252—321 |
| 3,076,768 | 2/1963 | Boylm | 252—321 |
| 3,235,509 | 2/1966 | Nitzsche et al. | 252—358 |
| 3,304,266 | 2/1967 | Sullivan | 252—321 |

JOHN D. WELSH, Primary Examiner

U.S. Cl. X.R.

252—358; 162—179